(12) United States Patent
Tosaka

(10) Patent No.: US 10,642,736 B2
(45) Date of Patent: *May 5, 2020

(54) EFFICIENT CACHE MEMORY HAVING AN EXPIRATION TIMER

(71) Applicant: International Business Machines Corporation, Armonk, NY (US)

(72) Inventor: Eiji Tosaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/264,263

(22) Filed: Jan. 31, 2019

(65) Prior Publication Data

US 2019/0163629 A1 May 30, 2019

Related U.S. Application Data

(63) Continuation of application No. 15/634,492, filed on Jun. 27, 2017, now Pat. No. 10,248,563.

(51) Int. Cl.
| | |
|---|---|
| *G06F 12/08* | (2016.01) |
| *G06F 12/0808* | (2016.01) |
| *G06F 12/128* | (2016.01) |
| *G06F 3/06* | (2006.01) |
| *G06F 12/12* | (2016.01) |

(52) U.S. Cl.
CPC ........ *G06F 12/0808* (2013.01); *G06F 3/0659* (2013.01); *G06F 12/128* (2013.01); *G06F 12/12* (2013.01); *G06F 2212/1024* (2013.01); *G06F 2212/303* (2013.01); *G06F 2212/621* (2013.01)

(58) Field of Classification Search
None
See application file for complete search history.

(56) References Cited

U.S. PATENT DOCUMENTS

| | | |
|---|---|---|
| 10,248,563 B2 | 4/2019 | Tosaka |
| 2003/0093623 A1 | 5/2003 | Crook et al. |
| 2004/0064644 A1 | 4/2004 | Lin et al. |
| 2008/0052463 A1 | 2/2008 | Chitlur et al. |
| 2009/0106501 A1 | 4/2009 | Wang et al. |
| 2010/0332698 A1 | 12/2010 | Muller |
| 2014/0181377 A1 | 6/2014 | Kimmel et al. |

(Continued)

FOREIGN PATENT DOCUMENTS

JP  2007200292 A  8/2007

OTHER PUBLICATIONS

Wikipedia, "CPU Cache," Jun. 18, 2017, 21 pages, Retrieved From https://en.wikipedia.org/wiki/CPU_cache.

(Continued)

*Primary Examiner* — Kaushikkumar M Patel
(74) *Attorney, Agent, or Firm* — Zilka-Kotab, P.C.

(57) ABSTRACT

In one embodiment, a method includes selectively invalidating data stored in at least one cache line of a cache memory in response to a determination that a predetermined amount of time has passed since the at least one cache line was last accessed. The predetermined amount of time is shorter than a round-trip time to process a plurality of blocks of data stored sequentially to a ring buffer. In other embodiments, methods, systems, and computer program products are described for efficient use of cache memory using an expiration timer.

15 Claims, 6 Drawing Sheets

(56) References Cited

U.S. PATENT DOCUMENTS

| | | |
|---|---|---|
| 2015/0067264 A1 | 3/2015 | Eckert et al. |
| 2015/0169452 A1 | 6/2015 | Persson et al. |
| 2016/0062913 A1* | 3/2016 | Woo .................... G06F 12/0893 711/105 |
| 2018/0095884 A1 | 4/2018 | Kaminski et al. |
| 2018/0373631 A1 | 12/2018 | Tosaka |

OTHER PUBLICATIONS

Wikipedia, "Cache Coherence," May 9, 2017, 4 pages, Retrieved From https://en.wikipedia.org/wiki/Cache_coherence.
Tosaka, E., U.S. Appl. No. 15/634,492, filed Jun. 27, 2017.
Wikipedia, "Cache Memory," Jul. 6, 2016, 7 pages retrieved from https://ja.wikipedia.org/wiki/%E3%82%AD%E3%83%A3%E3%83%83%E3%82%B7%E3%83%A5%E3%83%A1%E3%83%A2%E3%83%AA.
Wikipedia, "Cache" May 14, 2017, 2 pages, Retrieved From https://en.wikipedia.org/wiki/Cache.
Notice of Allowance from U.S. Appl. No. 15/634,492, dated Nov. 19, 2018.
List of IBM Patents or Patent Applications Treated As Related.

* cited by examiner

EFFICIENT CACHE MEMORY HAVING AN EXPIRATION TIMER

BACKGROUND

The present invention relates to memory usage and management, and more particularly, to efficient use of cache memory using an expiration timer.

Cache memory is a small and extremely fast storage construct that is not available for use by software or other applications, as it is completely managed by hardware. Cache memory is used to store the most recently used (MRU) main memory (MM) data, otherwise known as working memory data. Cache memory is used in a wide variety of microprocessors, micro processing units (MPUs), central processing units (CPUs), multi-core processors, and other processors and processing units that are expected to provide faster, more efficient processing of MRU MM data.

Some more recently released MPUs, such as a PowerPC, are provided with a memory called an L1 cache that is utilized for executing loading and storing instructions (e.g., "Load/Store" instruction) at higher speeds than are possible using traditional memory systems. The addresses in which a "Load" or a "Store" instruction are usually performed in executing a program by the MPU are typically located close to one another, on a short-term basis. To take advantage of this typical address location, L1 cache is configured to store consecutive bytes numbering in the tens to hundreds, which is used to complete processing of a received instruction inside the MPU at higher speeds than are otherwise possible using memory stored outside of the MPU. However, the capacity of the L1 cache is much smaller than the capacities of any of a L2 cache, a L3 cache, a L4 cache, or a main memory outside the MPU. Furthermore, when an access to perform a "Load/Store" is made to an address for data other than data existing in the L1 cache, an operation is performed in which data in the L1 cache is written down to a memory outside the MPU and a new data block is called into the L1 cache.

During this operation, corruption of data may occur in rare cases, and may be caused due to the MPU not using updated data from the main memory, but rather using outdated data in the L1 cache by mistake.

SUMMARY

In one embodiment, a method includes selectively invalidating data stored in at least one cache line of a cache memory in response to a determination that a predetermined amount of time has passed since the at least one cache line was last accessed. The predetermined amount of time is shorter than a round-trip time to process a plurality of blocks of data stored sequentially to a ring buffer.

In another embodiment, a system includes a processing circuit having a cache memory therein, a ring buffer, and logic integrated with the processing circuit, executable by the processing circuit, or integrated with and executable by the processing circuit. The logic is configured to cause the processing circuit to selectively invalidate data stored in at least one cache line of the cache memory in response to a determination that a predetermined amount of time has passed since the at least one cache line was last accessed. The predetermined amount of time is shorter than a round-trip time for the processing circuit to process a plurality of blocks of data stored sequentially to the ring buffer.

In yet another embodiment, a computer program product includes a computer readable storage medium having program instructions embodied therewith. The embodied program instructions are executable by a processing circuit to cause the processing circuit to selectively invalidate, by the processing circuit, data stored in at least one cache line of a cache memory in response to a determination that a predetermined amount of time has passed since the at least one cache line was last accessed. The predetermined amount of time is shorter than a round-trip time to process a plurality of blocks of data stored sequentially to a ring buffer.

Other aspects and embodiments of the present invention will become apparent from the following detailed description, which, when taken in conjunction with the drawings, illustrate by way of example the principles of the invention.

DETAILED DESCRIPTION

Figure 1:
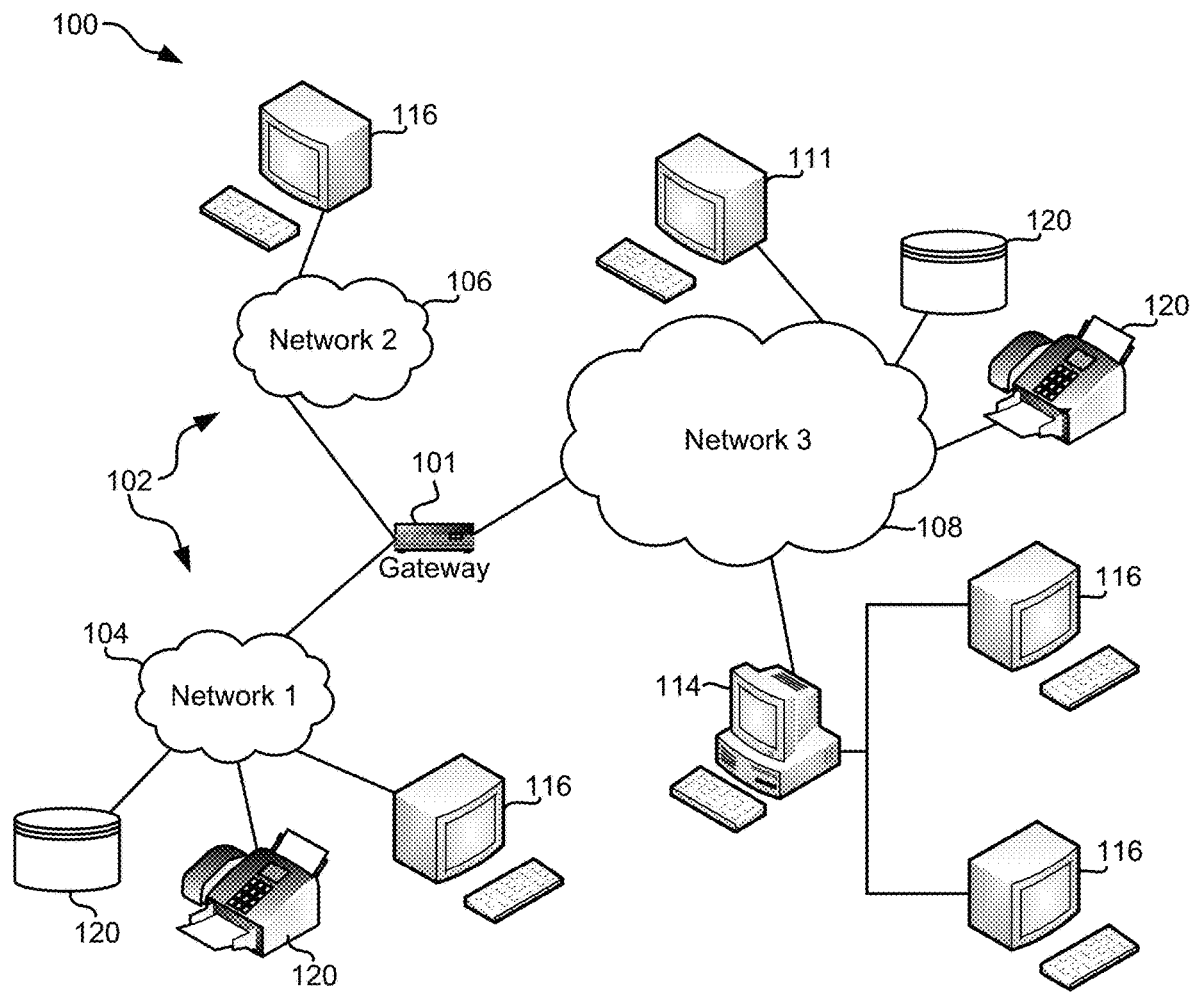
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

The following description discloses several preferred embodiments of systems, methods, and computer program products for efficient use and management of cache memory.

In one general embodiment, a method includes selectively invalidating data stored in at least one cache line of a cache memory of a processor in response to a determination that a predetermined amount of time has passed since the at least one cache line was last accessed. The predetermined amount of time is shorter than an average round-trip time for the processor to process a plurality of blocks of data stored sequentially to a ring buffer.

In another general embodiment, a system includes a processing circuit having a cache memory therein, a ring buffer, and logic integrated with the processing circuit, executable by the processing circuit, or integrated with and executable by the processing circuit. The logic is configured to cause the processing circuit to selectively invalidate data stored in at least one cache line of the cache memory in response to a determination that a predetermined amount of time has passed since the at least one cache line was last accessed. The predetermined amount of time is shorter than an average round-trip time for the processing circuit to process a plurality of blocks of data stored sequentially to the ring buffer.

In yet another general embodiment, a computer program product includes a computer readable storage medium having program instructions embodied therewith. The embodied program instructions are executable by a processing circuit to cause the processing circuit to selectively invalidate, by the processing circuit, data stored in at least one cache line of a cache memory in response to a determination that a predetermined amount of time has passed since the at least one cache line was last accessed. The predetermined amount of time is shorter than an average round-trip time for the processing circuit to process a plurality of blocks of data stored sequentially to a ring buffer. Also, the processing circuit includes the cache memory.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
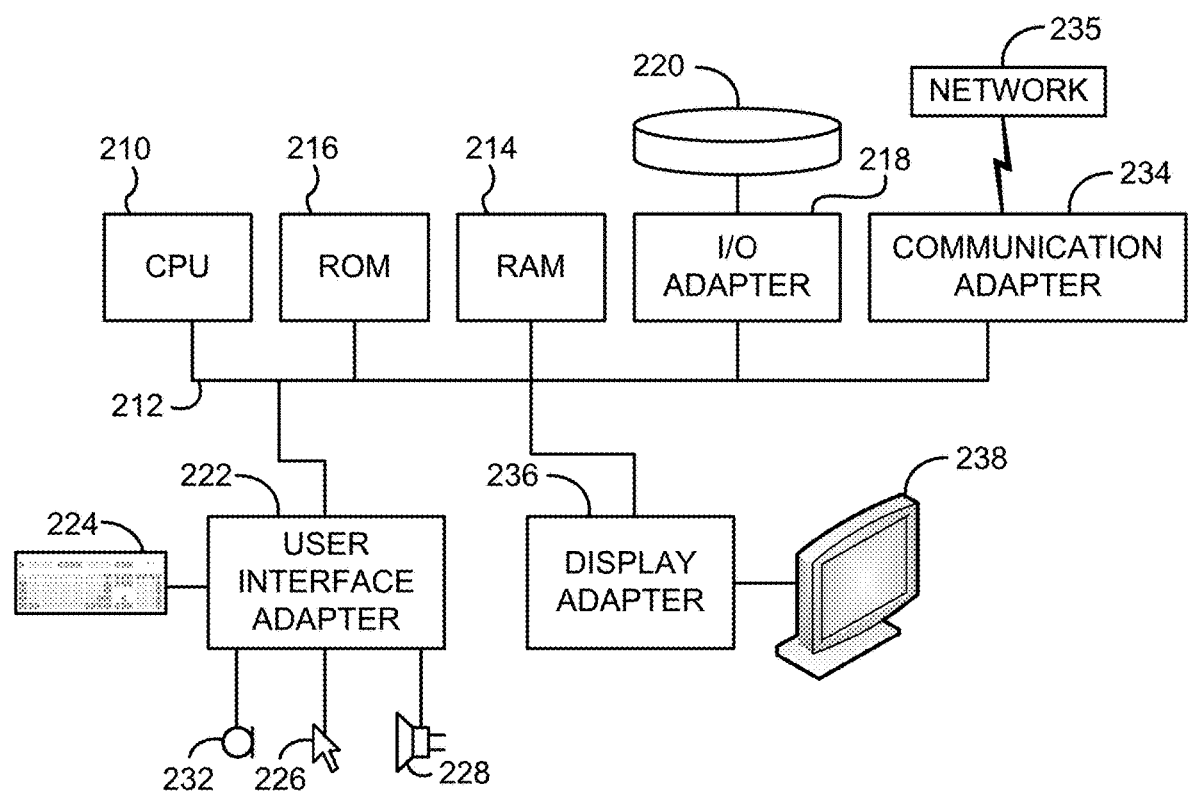
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

According to one embodiment, a remote controlled device may be unlocked in response to an authentication process that authorizes the user of the remote controlled device to fully use the available functionality of the remote controlled device. The authentication process, in a further embodiment, may rely on validation of a predetermined number, profile, or some other identification information that the user is required to provide to a validation service via a remote controller. Moreover, in yet another embodiment, the user may be required to provide the identification information in an ongoing basis while operating the remote controlled device.

Figure 3:
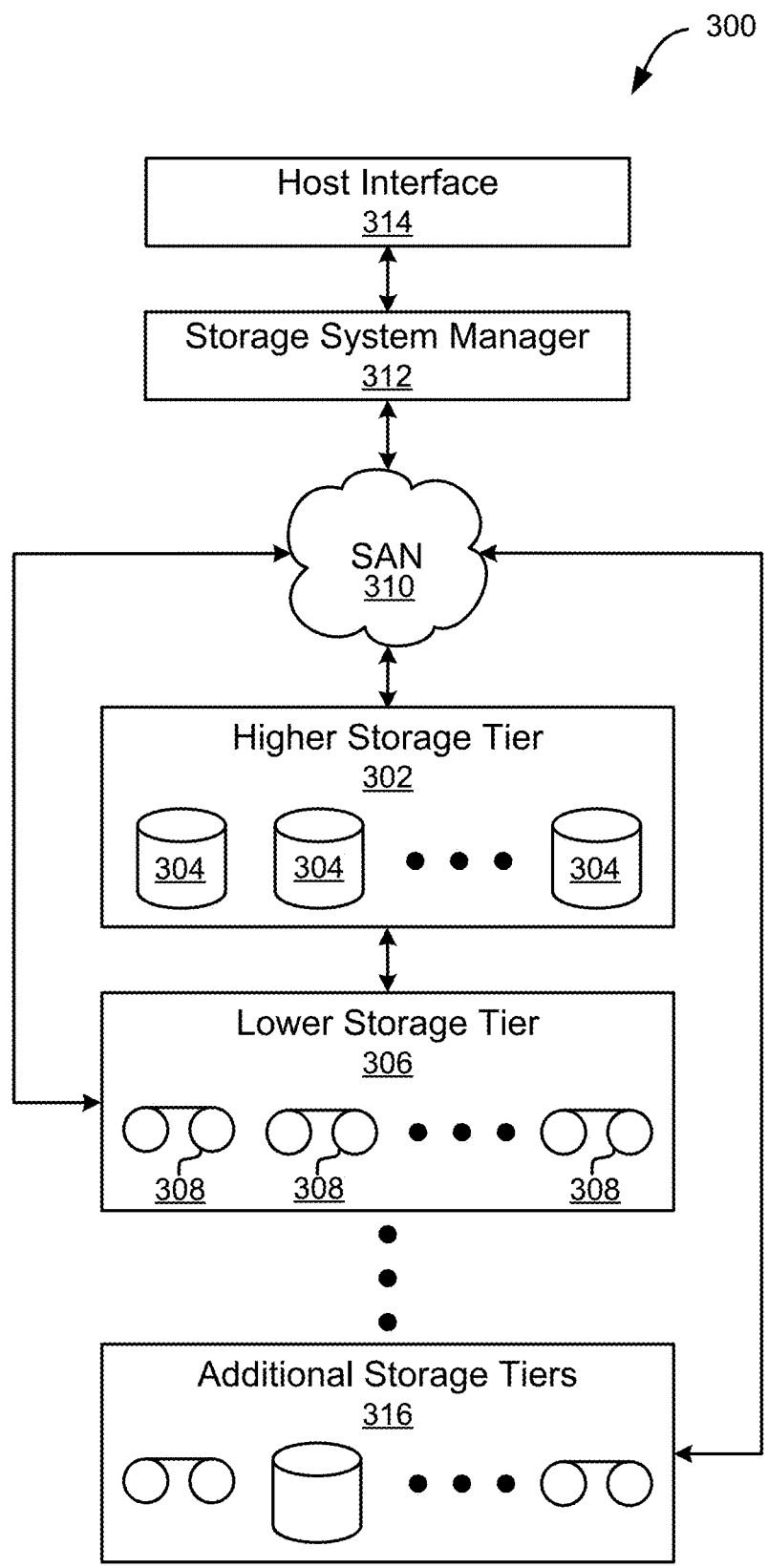
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as nonvolatile memory (NVM), solid state memory in solid state drives (SSDs), flash memory, SSD arrays, flash memory arrays, hard disks in hard disk drives (HDDs), etc., and/or others noted herein or known in the art. The lower storage tier(s) 306 may preferably include one or more lower performing storage media 308, including slower accessing HDDs, sequential access media such as magnetic tape in tape drives and/or optical media, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media (up to and including all SSD storage media) for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

In one particular embodiment, the storage system 300 may include a combination of SSDs and HDDs, with the higher storage tier 302 including SSDs (and possibly some buffer memory) and the lower storage tier 306 including HDDs (and possibly some buffer memory). According to another embodiment, the storage system 300 may include a combination of SSDs and magnetic tape with magnetic tape drives, with the higher storage tier 302 including SSDs (and possibly some buffer memory) and the lower storage tier 306 including magnetic tape (and possibly some buffer memory) and magnetic tape drives for accessing data from the magnetic tapes. In yet another embodiment, the storage system 300 may include a combination of HDDs and magnetic tape, with the higher storage tier 302 including HDDs (and possibly some buffer memory) and the lower storage tier 306 including magnetic tape (and possibly some buffer memory).

Figure 4:
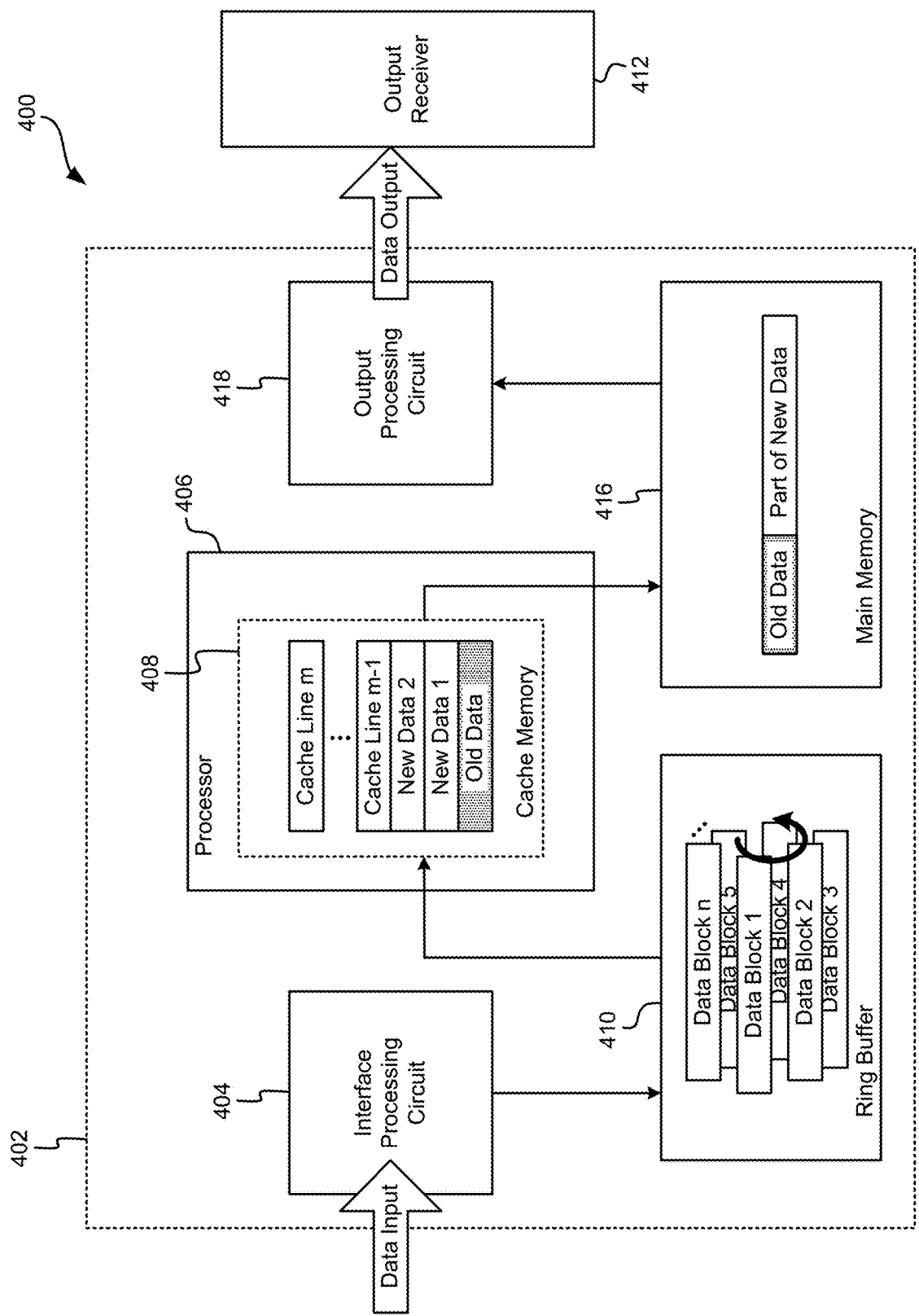
FIG. 4 shows a block diagram of a system, according to one embodiment.

Now referring to FIG. 4, a block diagram of a system 400 is shown according to one embodiment. The system 400 includes a data transfer adapter 402 and an output receiver 412. The data transfer adapter 402 is configured with an interface processing circuit 404, a processor 406 that comprises a main memory 416, a cache memory 408, and a ring buffer 410. The output receiver 412 may be a device driver on the system 400, such as a personal computer (PC), server, host, mainframe, etc., or some other receiving circuit of a device which utilizes the data transfer adapter 402.

Amy suitable memory types may be used for the ring buffer 410 and the cache memory 408 of the processor 406, as would be understood by one of skill in the art. Illustrative types of processing circuits or processors suitable for use as the processor 406 include, but are not limited to, a MPU, a CPU, an ASIC, a FPGA, a PowerPC, etc., combinations thereof, or any other suitable processor known in the art.

In operation, data received by the data transfer adapter 402 (which is transmitted from the outside of the data transfer adapter 402) is received by the interface processing circuit 404 and then stored to the ring buffer 410. After data has been stored to the ring buffer on the input side of the processor 406, the data is processed out of the ring buffer 410 by the processor 406 and/or other aspects of firmware present in the data transfer adapter 402, such as on a first-in-first-out (FIFO) processing scheme (or some other suitable processing scheme known in the art). Thereafter, the data is transferred to the output receiver 412, such as via an output processing circuit 418.

On the data input side, the interface processing circuit 404 may be a Fibre Channel (FC) processing circuit or dedicated logical chip, or some other suitable component configured to handle the data receiving duties for the data transfer adapter 402.

On the data output side, the output processing circuit 418 may be used to handle the data outputting duties for the data transfer adapter 402. The output processing circuit 418 may be configured to utilize any suitable bus protocol, such as peripheral component interconnect (PCI), PCI express (PCIe), PCI extended (PCI-X), universal serial bus (USB), etc.

Further, the ring buffer 410 may have a storage capacity of about 1 GB, or more or less in various embodiments. When the ring buffer 410 has a 1 GB capacity, it may be divided into and managed in 128K divided blocks, each block having a storage capacity of 8 KB. Received data is written from the interface processing circuit 404 to the ring buffer 410, and thereafter, sequentially processed by the processor 406 (and stored to the cache memory 408 of the processor 406 during the processing). In this arrangement, the firmware manages the ring buffer 410 so that the interface processing circuit 404 and the processor 406 do not make an access to the same block of data at the same time. After the processing by the processor 406 is completed (successfully), the ring buffer 410 is opened to allow the remaining blocks of data from the 128K blocks of data stored to the ring buffer 410 to be accessed by the processor 406. This is necessary because the cache memory 408 has a smaller storage capacity as compared to the ring buffer 410.

After processing all set of blocks of data through the processor 406 from the ring buffer 410, the ring buffer 410 is used again to store another 128K blocks of data (new data).

In this implementation, in most cases, a cache memory 408 miss is reported by the processor 406 and/or firmware during processing of the newly stored 128K blocks of data. Therefore, this signals to the processor 406 that any data stored to the cache memory 408 after all blocks of data in the ring buffer 410 have been processed (the ring buffer 410 has made a round trip), data is read again from the ring buffer 410 to the cache memory 408. However, on rare occasions, there are situations where the cache miss does not occur, for some reason, after processing of the data block stored to the cache memory 408 a round before and provided to the main memory 416 to be assembled prior to output, and the processor 406 is misled into believing the old data from the previous round of the ring buffer 410 left in the cache memory 408 is valid, thereby causing a problem where, to the processor 406, it appears as if the new data is corrupted once stored to the main memory 416, since it is actually the old data still stored to the cache memory 408.

Figure 5:
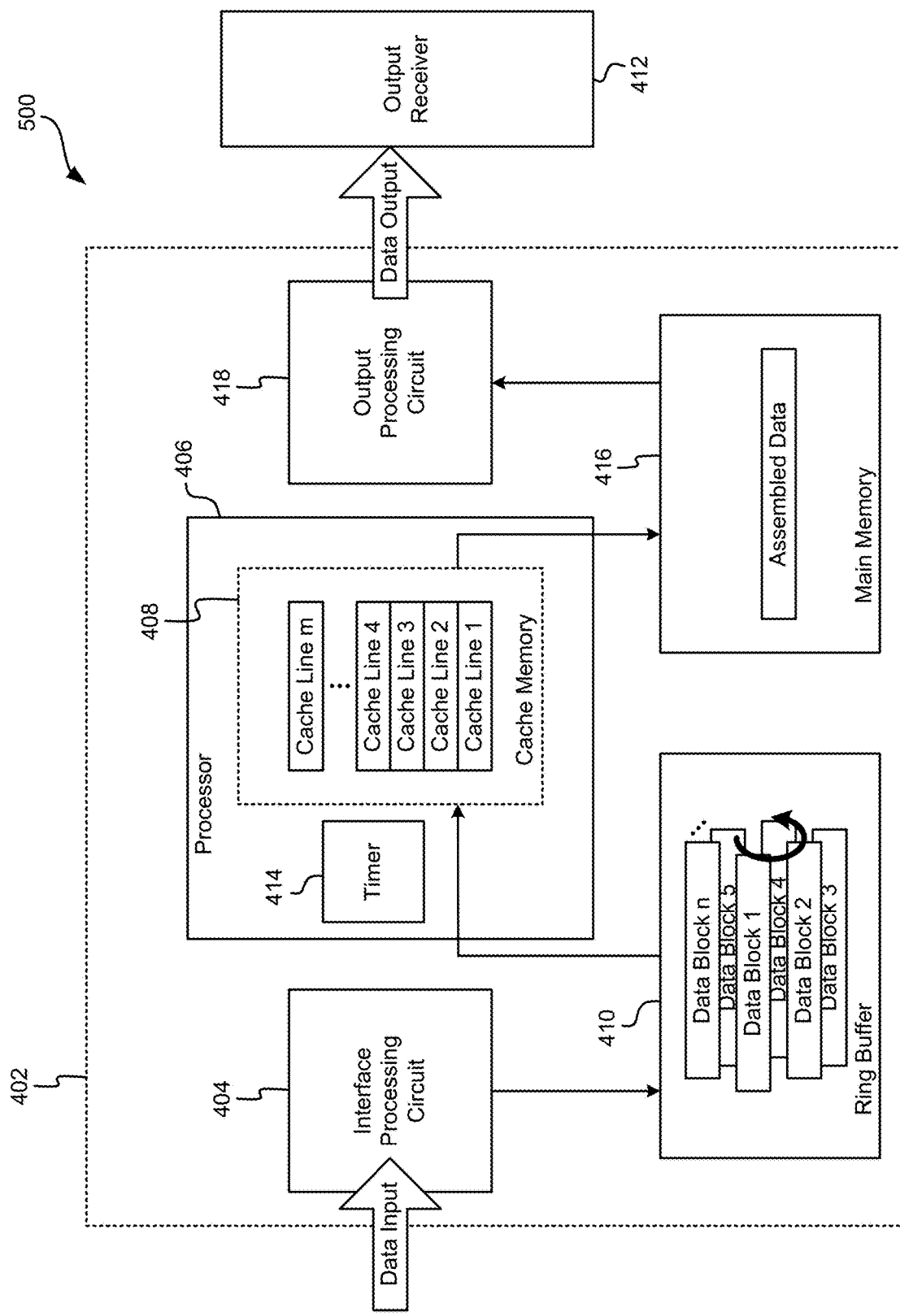
FIG. 5 shows a block diagram of a system, according to another embodiment.

In order to overcome this issue, with reference to FIG. 5, new functionality is provided in a system 500 which automatically "invalidates" data stored to the cache memory 408 in response to a determination that an access time to a specific cache line exceeds a predetermined amount of time, according to one embodiment. This functionality allows the processor 406 to perform the invalidity operation on any cache lines within the cache memory 408 on an ongoing basis distinct from processing of data from the ring buffer 410.

The cache memory 408 may include any fast memory type known in the art that is built into the processor 406 with a zero wait-state (delay) interface to the processor's execution unit. For example, the cache memory 408 may include static random access memory (SRAM) which may be organized into any suitable cache line size and total size as would be understood to one of skill in the art. Some exemplary total cache memory sizes include 16 KB, 32 KB, 64 KB, and 128 KB, while some exemplary cache line sizes include 4 bytes, 8 bytes, 16 bytes, 32 bytes, 64 bytes, etc.

The predetermined amount of time may be monitored with an internal timer 414 of the processor 406. Moreover, the predetermined amount of time may be set to be shorter than an average round-trip time for the processor 406 to process all blocks of data stored sequentially to the ring buffer 410. In one embodiment, the round-trip time may be based on an amount of time required for all data blocks stored to the ring buffer 410 to be sequentially overwritten. In this embodiment, blocks of data are stored to the ring buffer 410 sequentially one by one until all portions of the ring buffer 410 have data stored therein. The blocks of data may then be sequentially processed, either before all portions of the ring buffer 410 have data stored therein, or after the ring buffer 410 is filled, in a FIFO processing scheme such that the earliest stored data block is processed before any data block stored to the ring buffer 410 thereafter, providing a structure where data is routinely stored and processed cyclically through the ring buffer 410.

In one embodiment, the processor 406 may be provided with a mode of reading data from and writing data to the output receiver 412 from the main memory 416 of the system 500 in each "Load/Store" without using the cache memory 408. This mode may be set per each region of the memory, and accordingly, the ring buffer 410 and the cache memory 408 may be set separately in this mode. However, using this mode defeats the intrinsic benefits of utilizing the cache memory 408, such as high-speed performance that is greater than that capable of being provided with the main memory 416.

Moreover, as another solution, a method of invalidating data stored to the cache memory 408 related to a block of data stored to the ring buffer 410 every time the processing of the block of data in the ring buffer 410 is completed may also be considered. As a result, in this method, erroneous use of old data when the same block of data stored to the ring buffer 410 block is selected after making a round does not occur. However, in most cases, in the processing of any other block of data, old cache data is eliminated by the access of the ring buffer 410 unnecessarily. Therefore, pointless instructions are executed in this method.

As another benefit over other methods and systems devised to overcome the issue, when there are two or more components that make an access to a memory, it is necessary that the processor 406 perform mutual monitoring for strict management. However, since the data transfer adapter 402 uses a ring buffer 410 as its memory storage type, loss of coherency due to a simultaneous access does not occur.

Therefore, according to the system 500 shown in FIG. 5, according to one embodiment, the issue of data corruption during transfer is eliminated by the processor 406 functionality alone without the need for complicated structures, such as bus snooping or snarfing. Bus snooping is a scheme that a coherency controller (which acts as the snooper) in a cache memory monitors or "snoops" all bus transactions, in order to maintain a cache coherency in a distributed shared memory system. Bus snarfing is a scheme where multiple processors monitor each other's write access requests and observes the data for the same cache lines prior to the request receiving the bus in arbitration. As noted, each of these schemes introduce unwanted additional structures that complicate processing workload.

Figure 6:
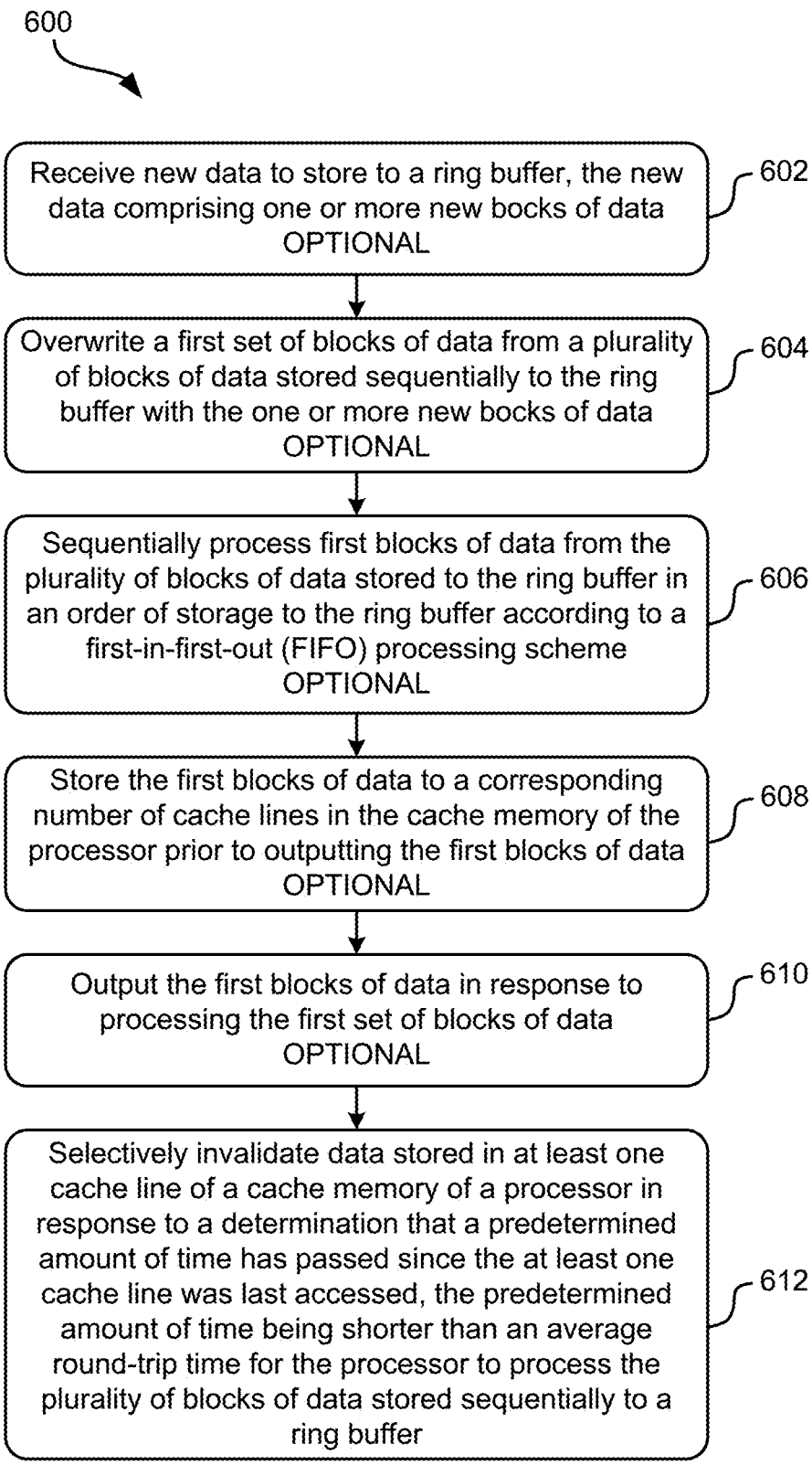
FIG. 6 shows a flowchart of a method according to one embodiment.

Now referring to FIG. 6, a method 600 is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a microprocessor, a server, a mainframe computer, a processing circuit having one or more processors therein, or some other device comprising one or more processors. The processing circuit, e.g., processor(s), chip(s), and/or module(s) implemented in hardware and/or software, and preferably having at least one hardware component, may be utilized in any device to perform one or more steps of the method 600. Illustrative processors include, but are not limited to, a MPU, a CPU, an ASIC, a FPGA, etc., combinations thereof, or any other suitable computing device known in the art.

As shown in FIG. 6, method 600 may start with optional operation 602, where new data to process, output, and/or store to a ring buffer is received, such as via an input processing circuit of a processor. The new data includes one or more new bocks of data therein, each new block of data being intended to be stored to the ring buffer. New data is differentiated from data that has already been or previously received, processed, output, and/or stored by the processor. Of course, when new data is sent to the processor that is equivalent to previously sent data, the processor does not distinguish between these types of data, and processes the new data as if it is newly and not previously received. However, data that is still stored to the processor or within any portion of the processing circuit is not considered new.

In optional operation 604, a first set of blocks of data from a plurality of blocks of data stored sequentially to the ring buffer are overwritten with the one or more new bocks of data. This operation determines where the new blocks of data are stored to the ring buffer, and also acts to invalidate the blocks of data currently stored to the ring buffer, as the overwritten blocks of data are no longer accessible from the ring buffer once overwritten. The first set of blocks are chosen to equal a number of the one or more new blocks of data, such that the new blocks of data are stored on a one-to-one ratio with the blocks of data that are overwritten from the ring buffer. Moreover, the first set of blocks of data are an oldest of the plurality of blocks of data stored sequentially to the ring buffer, thereby ensuring the FIFO scheme is maintained in the ring buffer.

In optional operation 606, first blocks of data from the plurality of blocks of data stored to the ring buffer are sequentially processed in an order of storage to the ring buffer according to a FIFO processing scheme. The first blocks of data are those which are the oldest stored to the ring buffer, as indicated by a time at which the data is stored to the ring buffer.

In optional operation 608, the first blocks of data are stored to a corresponding number of cache lines in a cache memory of the processor. This operation takes place prior to the processor outputting the first bocks of data, and is typically performed during the operation in which the data is processed by the processor and/or output by the processor.

In optional operation 610, the first blocks of data are output in response to successfully processing the first set of blocks of data, such as via an output processing circuit of the processor. Outputting includes any transfer of the data to another component and/or storage of the data to a memory different than the ring buffer and/or a cache memory of the processor.

In operation 612, data stored in at least one cache line of the cache memory of the processor is selectively invalidated in response to a determination that a predetermined amount of time has passed since data stored to the at least one cache line was last accessed.

The cache memory may include any fast memory type known in the art that is built into the processor with a zero wait-state (delay) interface to the processor's execution unit. For example, the cache memory may include SRAM which may be organized into any suitable cache line size and total size as would be understood to one of skill in the art. Some exemplary total sizes include 16 KB, 32 KB, 64 KB, and 128 KB, while some exemplary cache line sizes include 4 bytes, 8 bytes, 16 bytes, 32 bytes, 64 bytes, etc.

The predetermined amount of time is set to be shorter than an average round-trip time for the processor to process the plurality of blocks of data stored sequentially to the ring buffer. The ring buffer is readily accessible to the processor, and the processor comprises the cache memory, such as being an L1 cache, as would be understood by one of skill in the art.

In one embodiment, the round-trip time may be based on an amount of time required for all data blocks stored to the ring buffer to be sequentially overwritten. In this embodiment, blocks of data are stored to the ring buffer sequentially one by one until all portions of the ring buffer have data stored therein. The blocks of data may then be sequentially processed, either before all portions of the ring buffer have data stored therein, or after the ring buffer is filled, in a FIFO processing scheme such that the earliest stored data block is processed before any data block stored to the ring buffer thereafter, providing a structure where data is routinely stored and processed cyclically through the ring buffer.

In the next embodiments, "first" indicates earliest stored, while "last" indicates latest stored within one rotation through the ring buffer, with a rotation indicating that each portion of the ring buffer has either had data stored therein, or has had data processed therefrom. According to one embodiment, the amount of time that transpires from when the first block of data is stored to the ring buffer until the last block of data is processed from the ring buffer may be used as the round-trip time. In another embodiment, the amount of time that transpires from when the last block of data is stored to the ring buffer until the last block of data is processed from the ring buffer may be used as the round-trip time. In yet another embodiment, the amount of time that transpires from when the first block of data is stored to the ring buffer until the first block of data is processed from the ring buffer may be used as the round-trip time.

In another embodiment, the average round-trip time for the ring buffer may be based on complete processing of the ring buffer for a predetermined number (N) of previous cycles (or rotations) of the ring buffer. In a further embodiment, the predetermined number (N) of previous cycles (or rotations) may be an integer in a range from 2 to 50, such as 5, 10, 25, etc.

Method 600 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic, with the processor possibly being a MPU, a CPU, a microprocessor, etc. The logic is configured to cause the processing circuit to perform method 600.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 600.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
selectively invalidating data stored in at least one cache line of a cache memory in response to a determination that a predetermined amount of time has passed since the at least one cache line was last accessed, the predetermined amount of time being shorter than a round-trip time to process a plurality of blocks of data stored sequentially to a ring buffer.

2. The method as recited in claim 1, wherein the round-trip time is based on an amount of time required for all data blocks stored to the ring buffer to be sequentially overwritten.

3. The method as recited in claim 1, comprising:
sequentially processing first blocks of data from the plurality of blocks of data stored to the ring buffer in an order of storage to the ring buffer according to a first-in-first-out (FIFO) processing scheme; and
outputting the first blocks of data in response to processing the first blocks of data.

4. The method as recited in claim 3, comprising storing the first blocks of data to a corresponding number of cache lines in the cache memory prior to outputting the first blocks of data.

5. The method as recited in claim 1, comprising:
receiving new data to store to the ring buffer, the new data comprising one or more new bocks of data; and
overwriting a first set of blocks of data from the plurality of blocks of data stored sequentially to the ring buffer with the one or more new bocks of data, the first set of blocks equaling a number of the one or more new blocks of data,
wherein the first set of blocks of data are an oldest of the plurality of blocks of data stored sequentially to the ring buffer.

6. A system, comprising:
a processing circuit having a cache memory therein;
a ring buffer; and
logic integrated with the processing circuit, executable by the processing circuit, or integrated with and executable by the processing circuit, the logic being configured to cause the processing circuit to:
selectively invalidate data stored in at least one cache line of the cache memory in response to a determination that a predetermined amount of time has passed since the at least one cache line was last accessed, the predetermined amount of time being shorter than a round-trip time for the processing circuit to process a plurality of blocks of data stored sequentially to the ring buffer.

7. The system as recited in claim 6, wherein the round-trip time is based on an amount of time required for all data blocks stored to the ring buffer to be sequentially overwritten.

8. The system as recited in claim 6, wherein the logic is configured to cause the processing circuit to:
sequentially process first blocks of data from the plurality of blocks of data stored to the ring buffer in an order of storage to the ring buffer according to a first-in-first-out (FIFO) processing scheme; and
output the first blocks of data in response to processing the first blocks of data.

9. The system as recited in claim 8, wherein the logic is configured to cause the processing circuit to:
store the first blocks of data to a corresponding number of cache lines in the cache memory of the processing circuit prior to outputting the first blocks of data.

10. The system as recited in claim 9, wherein the logic is configured to cause the processing circuit to:
receive new data to store to the ring buffer, the new data comprising one or more new bocks of data; and
overwrite a first set of blocks of data from the plurality of blocks of data stored sequentially to the ring buffer with the one or more new bocks of data, the first set of blocks equaling a number of the one or more new blocks of data,
wherein the first set of blocks of data are an oldest of the plurality of blocks of data stored sequentially to the ring buffer.

11. A computer program product, the computer program product comprising a computer readable storage medium having program instructions embodied therewith, the embodied program instructions being executable by a processing circuit to cause the processing circuit to:
selectively invalidate, by the processing circuit, data stored in at least one cache line of a cache memory in response to a determination that a predetermined amount of time has passed since the at least one cache line was last accessed,
wherein the predetermined amount of time is shorter than a round-trip time to process a plurality of blocks of data stored sequentially to a ring buffer.

12. The computer program product as recited in claim 11, wherein the round-trip time is based on an amount of time required for all data blocks stored to the ring buffer to be sequentially overwritten.

13. The computer program product as recited in claim 11, wherein the embodied program instructions are executable by the processing circuit to cause the processing circuit to:
sequentially process, by the processing circuit, first blocks of data from the plurality of blocks of data stored to the ring buffer in an order of storage to the ring buffer according to a first-in-first-out (FIFO) processing scheme; and
output, by the processing circuit, the first blocks of data in response to processing the first blocks of data.

14. The computer program product as recited in claim 13, wherein the embodied program instructions are executable by the processing circuit to cause the processing circuit to:
store, by the processing circuit, the first blocks of data to a corresponding number of cache lines in the cache memory prior to outputting the first blocks of data.

15. The computer program product as recited in claim 14, wherein the embodied program instructions are executable by the processing circuit to cause the processing circuit to:
receive, by the processing circuit, new data to store to the ring buffer, the new data comprising one or more new bocks of data; and
overwrite, by the processing circuit, a first set of blocks of data from the plurality of blocks of data stored sequentially to the ring buffer with the one or more new bocks of data, the first set of blocks equaling a number of the one or more new blocks of data,
wherein the first set of blocks of data are an oldest of the plurality of blocks of data stored sequentially to the ring buffer.

* * * * *